United States Patent [19]

Yoshinari

[11] E Patent Number: Re. 32,168

[45] Reissued Date of Patent: Jun. 3, 1986

[54] DISTRIBUTOR FOR CONTACTLESS IGNITION APPARATUS FOR INTERNAL COMBUSTION ENGINE

[75] Inventor: Takashi Yoshinari, Katsuta, Japan

[73] Assignee: Hitachi, Ltd., Tokyo, Japan

[21] Appl. No.: 566,155

[22] Filed: Dec. 28, 1983

Related U.S. Patent Documents

Reissue of:

[64] Patent No.: 4,307,698
Issued: Dec. 29, 1981
Appl. No.: 15,153
Filed: Feb. 26, 1979

[30] Foreign Application Priority Data

Feb. 24, 1978 [JP] Japan ..... 53-19695

[51] Int. Cl.[4] ..... F02P 7/067

[52] U.S. Cl. ..... 123/647; 123/617; 123/146.5 A; 200/19 M; 310/70 A

[58] Field of Search ..... 123/146.5 A, 647, 617; 310/70 R, 70 R; 200/19 M

[56] References Cited

U.S. PATENT DOCUMENTS

| | | | |
|---|---|---|---|
| 3,198,973 | 8/1965 | Short et al. | 123/617 |
| 3,744,466 | 7/1973 | Brammer et al. | 123/617 |
| 3,783,314 | 1/1974 | Kostan | 123/146.5 A |
| 3,820,521 | 6/1974 | Longstaff-Tyrrell | 123/595 |
| 3,853,108 | 12/1974 | Adams et al. | 123/617 |
| 3,882,840 | 5/1975 | Adamian et al. | 123/609 |
| 3,888,225 | 6/1975 | Boyer et al. | 123/146.5 A |
| 4,037,577 | 7/1977 | Gallo | 123/146.5 A |
| 4,057,045 | 11/1977 | Stellwagen | 123/146.5 A |
| 4,224,917 | 9/1980 | Nakazawa et al. | 123/146.5 A |

FOREIGN PATENT DOCUMENTS

| | | | |
|---|---|---|---|
| 2310475 | 12/1976 | France | 123/146.5 A |

*Primary Examiner*—Andrew M. Dolinar
*Attorney, Agent, or Firm*—Antonelli, Terry & Wands

[57] ABSTRACT

A distributor for a contactless ignition apparatus of an internal combustion engine is disclosed. An ignition control circuit unit of contactless type is comprised of a case containing the ignition control IC circuit and a mold resin of the pick-up coil integrally formed with the case. The distributor contains closed magnetic circuit-forming means comprising a distributor shaft rotatable in synchronism with the engine, a reluctor or rotor fixed on the shaft and having claws in the number corresponding to the number of engine cylinders, a stator having a pair of claws opposed to the claws of the reluctor and mounted on the movable base of the angle advancer for advancing the ignition timing in response to a negative vacuum pressure, and a permanent magnet for generating a closed magnetic circuit through the reluctor stator and shaft. The pick-up coil of the ignition control circuit unit is arranged to cross the closed magnetic circuit, which unit is fixed within the distributor.

25 Claims, 7 Drawing Figures

DISTRIBUTOR FOR CONTACTLESS IGNITION APPARATUS FOR INTERNAL COMBUSTION ENGINE

Matter enclosed in heavy brackets [ ] appears in the original patent but forms no part of this reissue specification; matter printed in italics indicates the additions made by reissue.

The present invention relates to a distributor for a contactless ignition apparatus for an internal combustion engine, or more in particular to a distributor for the contactless ignition apparatus for the internal combustion engine so constructed that the distributor contains a pick-up coil for detecting the ignition point and a semiconductor control circuit for amplifying an ignition signal and applying it to the igniton coil.

In the contactless ignition apparatus, a small voltage signal generated in the pick-up coil is amplified by an amplifier, the output of which is used to control a semiconductor switch for interrupting the primary current of the ignition coil. As disclosed in U.S. Pat. No. 3,882,840, and ignition control circuit comprising an amplifier circuit and a transistor circuit for detecting the small voltage signal generated from the pick-up coil and a circuit for energizing the switching element are driven by a very low voltage and current thanks to the introduction of integrated circuits.

The pick-up coil is contained within the distributor, while the ignition coil is disposed far away from the distributor, and therefore the pick-up coil, the control circuit and the ignition coil are connected by long wires.

In view of the above-mentioned fact that the control circuit including integrated circuits is driven by a low voltage or current signal, the problem is posed that the ignition timing is disturbed by such noise as a surge voltage of the high-voltage distribution cord and a stray magnetic field from the pick-up coil.

According to a well-known method for solving this problem of noise as disclosed in U.S. Pat. No. 3,888,225, the transistor circuit for detecting the ignition timing signal, the amplifier circuit, the semiconductor switching element and the energization circuit for the switching element are constructed as one electronic circuit unit of several integrated circuits and arranged in the distributor containing the pick-up coil, thus minimizing the wiring length from pick-up coil to the control circuit and within the control circuit.

In this construction with the control circuit incorporated within the distributor, the pick-up coil, the control circuit and the means for forming the closed magnetic circuit are required to be mounted in a limited space. This inconvenience must not lead to the bulkiness of the distributor nor to the difficulty of assembly work.

Another factor to be taken into consideration is the radiation of heat generated by the semiconductor switching circuit in the control circuit.

Accordingly, it is an object of the present invention to provide a distributor for the contactless ignition apparatus in which the pick-up coil, the control circuit unit and the means for forming the closed magnetic circuit are constructed in a simple way to minimize the size of the distributor on the one hand and to facilitate distributor assembly work on the other hand while at the same time taking into consideration sufficient heat radiation from the control circuit.

The feature of the present invention resides in that the IC control circuit of the contactless ignition apparatus is contained in the case formed integrally with the mold resin of the pick-up coil, that a closed magnetic circuit is formed within the distributor by a reluctor or rotor including a permanent magnet, a movable base, a stator and the distributor shaft, that the pick-up coil is arranged in a manner to cross the closed magnetic circuit, and that the case containing the control circuit integrated with the pick-up coil is arranged in a manner to contact a member high in thermal conductivity in the distributor.

According to one aspect of the present invention, there is provided a distributor for the contactless ignition apparatus of the internal combustion engine, comprising a distributor shaft adapted to rotate in synchronism with the engine, a distribution rotor mounted on the top of the shaft, an electrode for receiving power from the distribution rotor, a distributor cap to which the electrode is fixed, a housing combined with the cap to form the outline of the distributor and supporting the distributor shaft at the center thereof, a closed magnetic circuit formed by a permanent magnet in the housing, and means for changing the magnetic fluxes in the closed magnetic circuit at the time of ignition of the engine, the distributor further comprising a contactless ignition control circuit unit including an annular pick-up coil molded of resin, a case integrally coupled to the pick-up coil, and a control circuit module for the ignition control circuit which is contained in the case, the unit being fixedly arranged in such a manner that the pick-up coil crosses the closed magnetic circuit in the distributor and that the case is in contact with a heat conductive member in the distributor.

According to another aspect of the present invention, there is provided a distributor for the contactless ignition apparatus of the internal combustion engine, comprising a reluctor adapted to rotate with the distributor shaft and having a plurality of claws as many as the cylinders, which are formed on the periphery thereof at regular spatial intervals, a stator opposed to the claws and having at least one claw, a movable base carrying the stator, a fixed base for rotatably supporting the movable base and having the periphery thereof fixed to the housing, and a permanent magnet fixed to [teh] *the* movable base, the closed magnetic circuit including the distributor shaft, the movable base, the stator, the reluctor and the permanent magnet.

According to still another aspect of the present invention, there is provided a distributor for the contactless ignition apparatus for the internal combustion engine, wherein the movable base includes a semicircular flange and a cylindrical section integrally formed at the central part of the chord of the semicircular flange, the fixed base is annular in shape, the cylindrical section of the movable base is loosely fitted on the inner periphery of the fixed base, the flange of the movable base is rotatably supported on the upper side of the fixed base, the distributor shaft is arranged through the cylindrical section of the movable base, the stator is fixed on the semicircular flange of the movable base, a heat-conductive mount is fixed on that part of the fixed base which is not covered by the movable base, the case of the contactless ignition control circuit unit is fixed on the mount, and the pick-up coil of the unit is arranged around the shaft at a position intermediate of the movable base and the reluctor.

According to a further aspect of the present invention, there is provided a distributor for the contactless ignition apparatus for the internal combustion engine, wherein a distributor housing contains a reluctor driven by the engine and forming part of the magnetic circuit, a stator opposed to the outer periphery of the reluctor through a predetermined size of gap and forming part of the magnetic circuit, a permanent magnet arranged in part of the magnetic circuit, a pick-up coil for detecting changes in the magnetic fluxes occurring in the magnetic circuit, and a control circuit for interrupting the primary current of the ignition coil in response to the detection signal generated in the pick-up coil, said reluctor including claws equal in number to the engine cylinders and formed at regular spatial intervals on the outer periphery thereof, the stator including two claws being formed at an interval of 180 degrees on both sides of the reluctor, the two claws of said stator being aligned in a line crossing the rotational center of the reluctor.

The above and other objects, features and advantages will be made apparent by the detailed description taken in conjunction with the accompanying drawings, in which.

Figure 1:
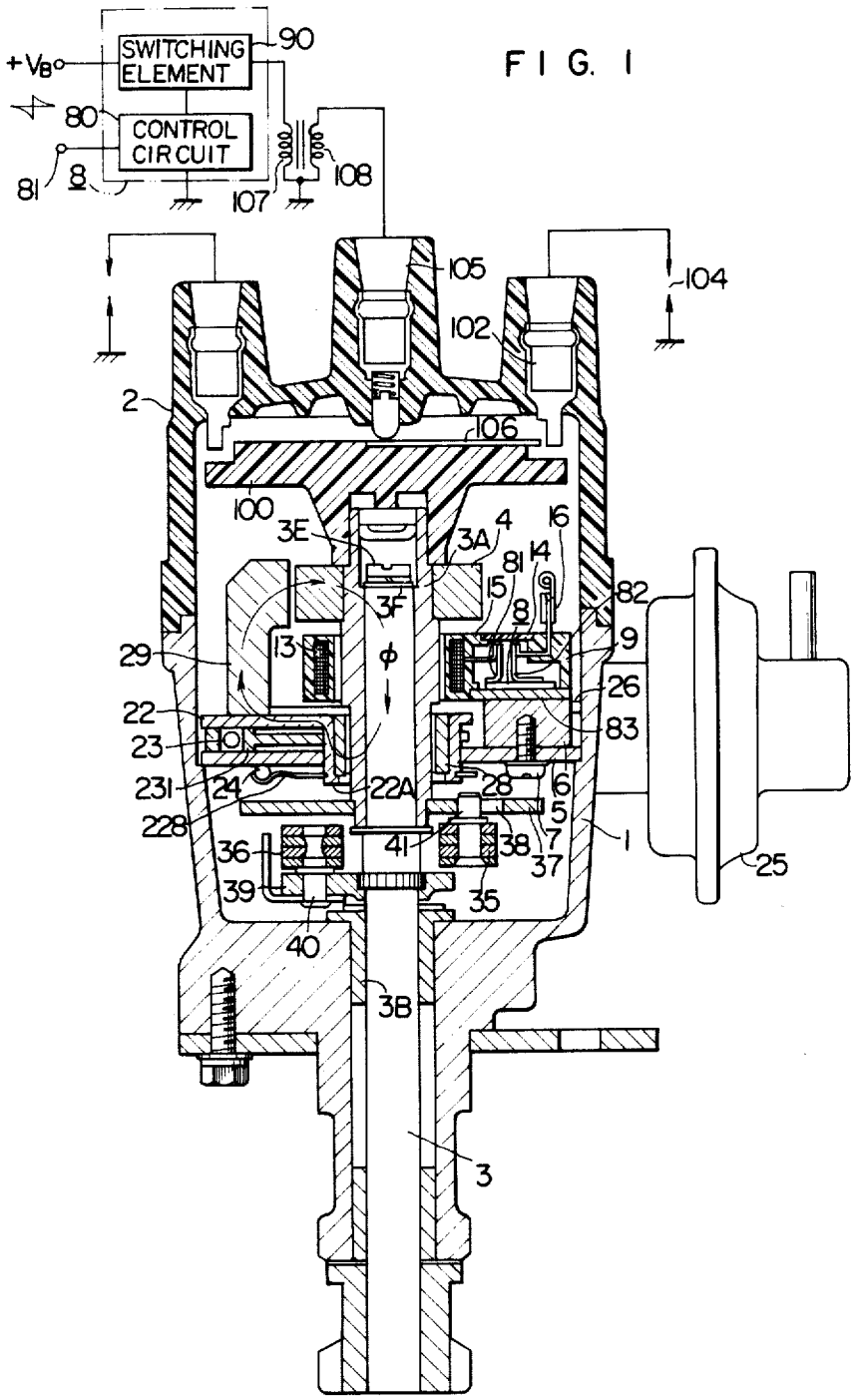
FIG. 1 is a longitudinal sectional view of the distributor according to an embodiment of the present invention taken along line I—I in FIG. 2 (excluding the wires)
Figure 2:
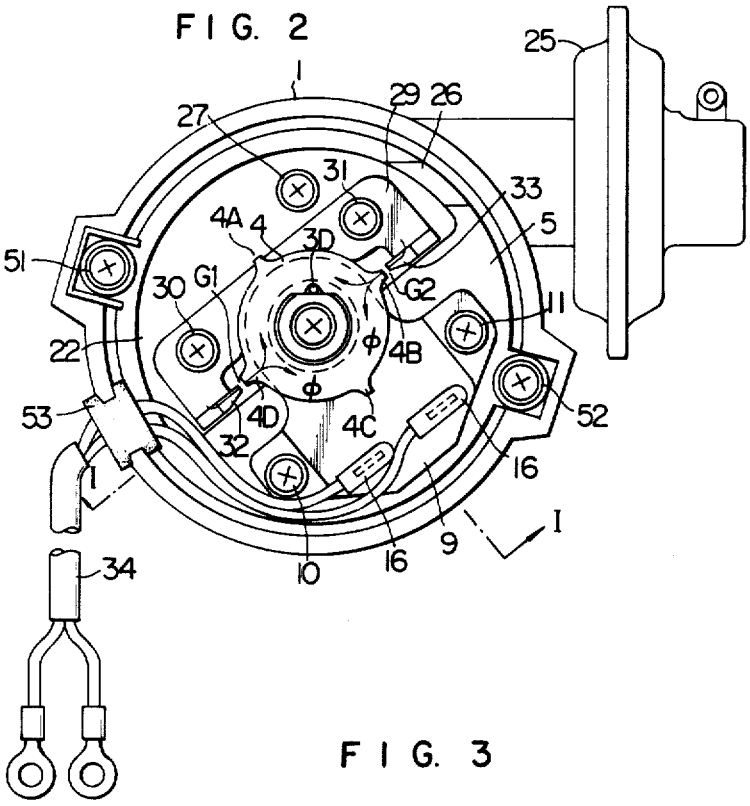
FIG. 2 is a plan view of the distributor without the cap.

Embodiments of the present invention will be described in detail below with reference to the accompanying drawings. In FIGS. 1 and 2, reference numberal 1 shows a housing of the distributor, and numeral 2 a cap. A shaft 3 rotated by the engine cam shaft is rotatably supported on the housing 1 by bearings 3B and 3C. A sleeve 3A is rotatably fitted in the shaft 3. An annular reluctor 4 is fixed on the outside of the sleeve 3A. Four magnetic poles 4A, 4B, 4C and 4D are protruded from the outer periphery of the reluctor 4. A circular fixed base 5 having a center hole for passing the shaft 3 is fixed in the housing 1 by means of scres 51 and 52 as shown in FIG. 2. An aluminum support 6 for mounting the control circuit is fixed by the screw 7 on one side of the fixed base 5 with respect to the shaft 3. A case 9 containing the control circuit module 8 is fixed on the support 6 by means of screws 10 and 11.

Figure 3:
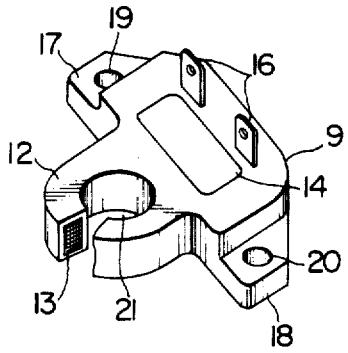
FIG. 3 is a partially sectional perspective view of the molded resin member for integrating the pick-up coil and the control circuit case.

The case 9 is formed integrally with resin for molding the annular pick-up coil 13 as shown in FIG. 3.

As shown in FIG. 1, the signal terminal 15 connected with the pick-up coil 13 extends in the case 9 and is connected with the signal receiving terminal 81 secured to the control circuit module 8. The output lead-out terminal 16 is also molded integrally with case 9, and an end thereof is extended in the case 9 and connected with output terminal 82 secured to the control circuit module 8.

The control circuit module 8 comprises a chip section, and an ignition signal generator circuit section including a signal detection transistor, an amplifier circuit and a drive circuit for the output transistor.

The base 83 is made of a nickel-plated aluminum plate. Aluminum oxide, copper and molybdenum layers are deposited on the aluminum plate 83 in that order by bonding or soldering, followed by the soldering of the output transistor chip on the molybdenum layer. The signal generating circuit section, on the other hand, is configured in such a manner that a circuit board printed with resistors is bonded on the aluminum base 83, on which a monolithic IC chip of an amplifier circuit, chip capacitor, a signal receiving terminal 81 and an output terminal 82 are mounted by soldering.

The case 9 has two holes. The periphery of the aluminum base 83 of the control circuit module 8 is bonded to the edge of a hole of the case 9 in such a manner as to face the inside of the case 9. Next, the terminals 15, 81 and 16, 82 are connected with each other through the other hole as mentioned above. Silicon resin in gel form is applied and covered on the module 8, and the hole is closed by the resin plate 14, thereby integrating the pick-up coil 13 with the control circuit module 8.

The case 9 includes the flanges 17, 18 and the annular section 12 integrated with each other as shown in FIG. 3. The inner diameter of the center hole of the annular section 12 is larger than the outer diameter of the sleeve 3A, so that in the assembled condition the sleeve 3A passes through the center hole 21. With the annular section 21 fittingly engaged with the sleeve 3A, the case 9 is fixed to the mount 6 with screws 10 and 11 through small holes 19 and 20 of flanges 17 and 18. The aluminum base 83 of the control circuit module 8 is thus brought into close contact with the aluminum mount thereby forming a path for radiating the heat generated by the output transistor.

Numeral 34 shows a lead wire connected with the output lead-out terminal 16 which is taken out through the rubber bushing 53. The cam plate 37 is fixed at the lower end of the sleeve 3A loosely fitted in the shaft 3. A radially extending slot 38 is notched in the cam plate 37. The weight support 39 fixed to the shaft 3 is arranged under the cam plate 37. A pair of crescentshaped weights 35 and 36 with an end thereof rotatably supported by the pin 40 are arranged on the weight support 39 symmetrically with respect to the shaft.

The other end of the weights 35 and 36 is kept urged by a spring (not shown) toward the shaft 3. When the centrifugal force due to the rotation of shaft 3 exceeds the spring force, the weights begin to rotate around the supporting points. Upon the rotation of the weights, the forward ends of the weights move outwardly in radial direction. A pin 41 is secured to the forward end of the weight 35 and engaged with the slot 38 of the cam plate 37. Therefore, when the forward ends of the weights 35 and 36 move outwardly in radial direction with the rotation thereof, the cam plate 37 receives the turning effort of the weights 35 and 36 through the pin 41 engaged with the groove 38 and begins to rotate.

Since the cam plate 37 is secured to the sleeve 3A, the rotation of the cam plate 37 causes the sleeve 3A to rotate slightly with respect to the shaft 3. The angle of this rotation is associated with the length of the slot 38 of the cam plate 37.

Upon rotation of the sleeve 3A with respect to shaft 3, the claws 4A, 4B, 4C and 4D of the reluctor 4 fixed on the sleeve 3A begin to rotate with respect to the position of the stator 29 (described later), so that the timing of generation of the ignition signal is adjusted with the deflection of the rotational angle as an advancing angle of ignition timing.

These elements make up the well-known centrifugal angle advancing mechanism and are described in detail in U.S. Pat. No. 2,306,549.

Figure 4:
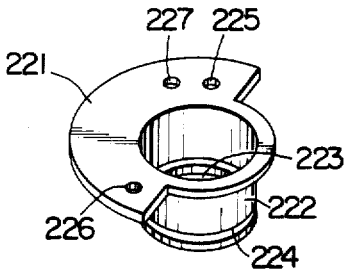
FIG. 4 is a perspective view of the movable base.

Numeral 22 shows a movable base including, as shown in FIG. 4, a semicircular flange section 221 and a cylindrical portion 222 formed at the central part of the chord of the flange section. The cylindrical portion 222 has a center aperture 223 for passing the sleeve 3A. The cylindrical permanent magnet 28 is fixedly press-fitted on the inner peripheral wall of the aperture 223 as shown in FIG. 1.

The fixed base 5 secured to the inner periphery of the housing 1 has a central aperture through which the shaft 3 is passed. The cylindrical portion 222 of the movable base 22 is loosely fitted into the aperture of the fixed base 5.

A ball 23 supported by the ball support 231 is held between the lower side of the flange section 221 of the movable base 22 and the upper side of the fixed base 5, so that the movable base 22 is rotatably arranged on the fixed base.

An annular groove 224 is formed at the lower outer periphery of the cylindrical portion 222 of the movable base 22, and the spring 228 is fitted into the annular groove 224. The spring 228 includes an arm extending radially, at the forward end of which a ball 24 is supported. The arm of the spring 228 functions to press the ball 24 against the back side of the fixed base 5, thus facilitating smooth rotation of the movable base 22.

The movable base 22 is engaged with a lever 26, through the screw 27, extended from the vacuum angle advancing mechanism 25, so that the movable base 22 is rotated in response to the displacement of the lever 26 of the vacuum angle advancing mechanism 25 which is caused by load changes of the engine.

The small hole 227 (shown in FIG. 4) formed in the flange section 221 of the movable base 22 is for passing the screw 27 for fixing the lever 26.

Figure 5:
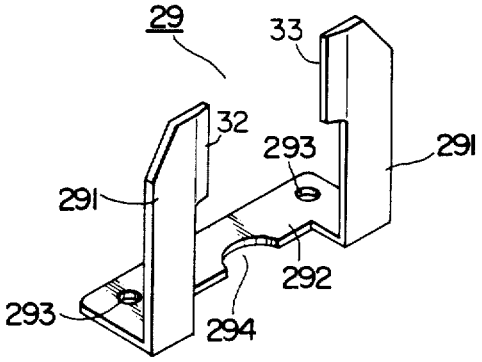
FIG. 5 is a perspective view of the stator; [and]

The stator 29 is secured on the movable base 22 by screws 30 and 31. The stator 29 is formed of a steel plate by press work, and as shown in FIG. 5, includes a pair of arms 291 extending in parallel to the shaft 3 and a base 292 connecting the lower ends of the arms. A pair of claws 32 and 33 are formed on the inside of the upper ends of the arms 291. When the stator 29 is fixed on the movable base 22, the hypothetical line connecting the claws 32 and 33 crosses the center of the shaft 3. When the reluctor 4 rotates a predetermined angle, the claws 4B and 4D of the reluctor 4 are positioned in the hypothetical line at the same time. Also, when the reluctor 4 rotates another predetermined angle, the claws 4A and 4C of the reluctor 4 are aligned in the hypothetical line. When the claws of the reluctor 4 are opposed to those of the stator 9, the distance between the claws 32 and 33 of the stator and the reluctor 4 is minimized, thereby forming small gaps G1 and G2.

The small holes 225 and 226 formed in the flange section 221 of the movable base 22 are ones into which screws are inserted for fixing the stator 29.

The procedures for assembling this embodiment will be explained below. The weight support 39 carrying the weights 35 and 36 is fixedly press-fitted on the shaft 3. The shaft 3 is inserted into the central hole of the housing and the sleeve 3A press-fitted with the cam plate 37 is fitted on the shaft 3. At the same time, the pins 41 and 40 of the weights 35 and 36 engaged the slot 38 of the cam plate 37.

The movable base 22 and the fixed base 5 are combined with each other separately and the resulting assembly is fitted on the sleeve 3A from above, and the fixed base 5 is fastened to the housing 1 with screws 51 and 52. Under this condition, the lever 26 of the vacuum angle advancing mechanism is engaged with the movable base 22 with screw 27.

The stator 29 may be either mounted in advance on the movable base 22 or alternatively mounted on it after the assembly of the movable base and the fixed base is built in the housing as desired.

The mount 6 is required to be screwed in advance from the back side of the fixed base. If the shape of the mount 6 is changed to enable it to be screwed from the upper side, however, the mount 6 may be screwed after the fixed base 5 is built in.

A hill functioning as a mount may be formed in advance on the fixed base, in which case neither the mount nor the work for fixing the mount is needed.

The ignition control circuit unit including the pick-up coil 13 and the control circuit module 8 integrated with each other is fixed on the mount 6 with screws 10 and 11 in such a manner that the annular section 12 formed by the pick-up coil 13 is fitted from the upper end of the sleeve 3A and the case 9 is rested on the mount 6. At the same time, the end of the lead wire 34 passed through the bushing 53 is connected with the output lead-out terminal 16 projected upward of the case 9, thus fixing the bushing 53 to the notch of the housing 1.

Next, the reluctor 4 is fittingly inserted from above the sleeve 3A, and the spring 3D (FIG. 2) is pressed into the fitting joint of the sleeve 3A and the reluctor 4 to prevent the removal or rotation thereof.

Numeral 3E shows a screw secured to the top of the shaft 3, and numeral 3F a washer for preventing removal of the sleeve 3A. Finally, the distribution rotor 100 is press fitted into the top of the sleeve 3A and the cap 2 is fixedly covered on the housing 1, thus completing the assembly work.

The operation of the distributor for the contactless ignition apparatus thus assembled will be explained below.

The permanent magnet mounted on the inner periphery of the cylindrical portion of the movable base 22 forms a closed magnetic circuit $\phi$ as shown by the arrows of solid line in FIGS. 1 and 2. This closed magnetic circuit is passed through the movable base 22, stator 29, reluctor 4, sleeve 3A, shaft 3, permanent magnet 28 and the movable base 22. The pick-up coil 13, which is arranged to surround the sleeve 3A, crosses the closed magnetic circuit $\phi$.

Upon rotation of the reluctor 4 with the rotation of the shaft, the gaps G1 and G2 between the claws 4A to 4D of the reluctor 4 and the claws 32 and 33 of the stator 29 undergo a change. This causes a change in magnetic fluxes within the closed magnetic circuit $\phi$. As a result, and induced voltage corresponding to the change in magnetic fluxes is generated in the pick-up coil 13 crossing the closed magnetic circuit $\phi$. This voltage is generated four times for each rotation of the reluctor 4, i.e., the shaft 3, in the waveform as shown in FIG. 6.

Figure 6:
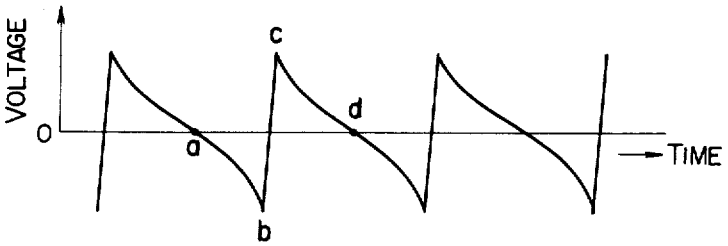
FIG. 6 shows the waveform of the voltage generated across the pick-up coil[.]

At point a in FIG. 6, the gap between the claws of the reluctor 4 and those of the stator 29 is largest, i.e., the reluctor 4 is rotated 45 degrees clockwise from the condition of FIG. 2.

When the reluctor 4 further rotates clockwise to such a degree that the claws 4A and 4C of the reluctor 4A approach the claws 33 and 32 of the stator 29, then the voltage of the waveform as shown by a to b in FIG. 6 is generated at the signal terminal 15 of the pick-up coil 32. At point b, the claws of the reluctor 4 are positioned in opposed relation with the claws of the stator 29. From point a to b, the magnetic fluxes in the closed magnetic circuit $\phi$ increase and reach the maximum at point b.

Upon further clockwise rotation of the reluctor 4, the claws of the reluctor 4 begin to go away from the claws of the stator 29, so that the magnetic fluxes in the closed magnetic circuit $\phi$ suddenly being to decrease. As a result, the induced voltage generated in the pick-up coil 13 instantaneously changes from the negative maximum value to the positive maximum value as shown by a to c in FIG. 6.

At the time of waveform change from point b to c which makes up the ignition timing, the control circuit cuts off the primary winding current of the ignition coil (not shown), thus inducing a high voltage in the secondary winding.

Upon further clockwise rotation of the reluctor 4, the claws of the reluctor and the stator come away from each other. When the reluctor 4 rotates 45 degrees, the change in magnetic fluxes ceases and the electric potential at the terminal 15 of the pick-up coil 13 is reduced to zero as shown by d in FIG. 6. The same process of operation is repeated, thereby producing a continuous AC waveform as shown in FIG. 6.

The magnitude of the voltage generated at the signal output terminal 15 of the pick-up coil 13 is determined by the magnetic fluxes crossing the pick-up coil 13. These magnetic fluxes, in turn, are dependent on the gaps between the claws of the stator 29 and those of the reluctor 4, so that the larger the gaps, the fewer the magnetic fluxes, and vice versa.

The quality of the gaps is greatly affected by the accuracy of the mounting position of the stator 29. In view of the fact that it is impossible to totally eliminate the clearance between component parts or production errors in assembly, different distributors have different gaps. As a result, the voltage generated at the terminal of the pick-up coil 13 greatly varies from one distributor to another.

The operating timing, time of supplying current to the primary winding and ignition timing are determined by the control circuit in a predetermined voltaage value. Therefore, the fact that the voltage generated at the pick-up coil 13 varies from one distributor to another leads to the inconvenience that the time of current supply to the primary winding or the ignition timing varies from one distributor to another. Such an inconvenience does not occur in this embodiment in which the stator 29 has a novel construction as mentioned above.

In other words, the claws 32 and 33 integrated with each other are arranged in opposed relation along a line passing the center of the shaft 3, so that the two gaps G1 and G2 are always formed between the claws 32, 33 and the claws of the reluctor 4. When one of the gaps increases, the other decreases, thus offsetting any increase in magnetic reluctance.

As a result, the sum of the magnetic fluxes passing through the gaps G1 and G2 remains substantially the same without regard to the magnitude of the gap G1 or G2. Thus, the number of magnetic fluxes crossing the pick-up coil 13 is substantially not affected by the magnitude of the gap G1 or G2, and therefore the above-mentioned inconvenience of the output voltage of the pick-up voltage varying from one distributor to another is eliminated.

This stator structure does not occupy much space within the distributor and therefore is especially effectively used with the distributor within which the control circuit module is mounted.

In the case where the vacuum angle advancing mechanism engaged with the movable base 22 or the centrifugal angle advancing mechanism engaged with sleeve 3A fails to operate, an ignition spark is generated at the plug when the engine piston is just reaching the top dead center.

Figure 7:
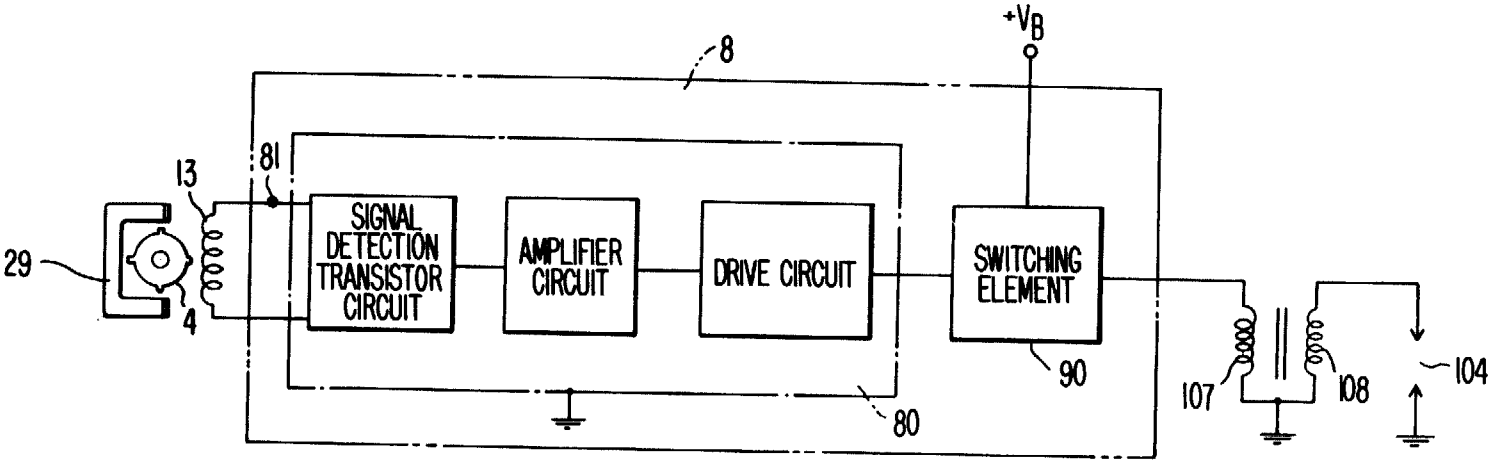
*FIG. 7 is a schematic view of an ignition control circuit means for an ignition apparatus constructed in accordance with the present invention.*

When the signal input terminal 81 of the control circuit 80 is impressed with a voltage changing from point b to c in FIG. 6, the control circuit 80 *which, as shown in FIG. 7, includes a signal detection transistor circuit, amplifier circuit, and drive circuit,* is actuated and the semiconductor switching element 90 is turned off, thus cutting off the current thus far supplied to the primary winding 107 of the ignition coil through the lead wire 34.

In the process, the high voltage generated at the secondary winding 108 of the ignition coil is introduced to the ignition plug 104 through the central electrode 105 fixed at the center of the cap 2 of the distributor, the rotor electrode of the distribution rotor 100 and the stationary electrodes 102 arranged at regular intervals around the central electrode 105 in the same manner as the engine cylinders. When the next signal is applied to the signal input terminal 81, the distribution rotor has rotated to the position of the next stationary electrode, and therefore the high voltage is introduced to another ignition plug. This operation is repeated as many times as the engine cylinders during the rotation of the shaft.

Upon actuation of an angle advancing mechanism, the timing of forming the gaps G1 and G2 by the claws of reluctor 4 and those of stator 29 occurs before the engine piston reaches the top dead center and therefore an ignition spark is generated before the piston reaches the top dead center. This operation is performed by actuation of either of the angle advancing mechanisms. When the two angle advancing mechanisms are actuated at the same time, the angle advancing effect is doubled.

The present invention may be modified as follows:

1. The pick-up coil and the case containing the control circuit module are formed separately and they are integrally fixed when incorporated in the distributor.

2. Instead of the centrifugal angle advancing mechanism, an electronic angle advancing mechanism is formed in the control circuit and the reluctor is fixed directly on the distributor shaft.

3. The control circuit is provided with an electronic angle delaying device.

The advantage of the present invention is that in spite of the pick-up coil, and the control circuit module being arranged within the distributor, the contactless ignition device made up of them is very simple in construction, so that the distributor is not increased in size nor is the assembly work made difficult.

What is claimed is:

1. A distributor for a contactless ignition apparatus of an internal combustion engine having a number of cylinders, comprising: a distributor shaft adapted to rotate in synchronism with the engine; a distribution rotor arranged to rotate together with said shaft; a fixed electrode for receiving power from said distribution rotor; a distributor cap to which said fixed electrode is fixed; a housing combined with said cap to form the outline of the distributor and supporting said distribution shaft at the center thereof; a reluctor arranged to rotate together with said shaft having a number of claws equal in number to the number of engine cylinders and mounted on the periphery of said reluctor at equal spatial intervals; a stator having at least one claw arranged to be opposite to said reluctor claws, a movable base having a semi-circular flange on which said stator is mounted; a fixed base for rotatably supporting said movable base and the periphery of said fixed base being fixed to said housing; a permanent magnet for forming a closed magnetic path in conjunction with said reluctor, said stator, said movable base, and said distributor shaft; an annular pick-up coil coaxially disposed around said distributor shaft and arranged so as to cross a portion of said magnetic path passing through said shaft; a case integrally coupled to said pick-up coil; ignition control means received to said case; and means for supporting, in a cantilever fashion, the pick-up coil, by way of said case, on a portion of said fixed base which is not covered by said movable base.

2. A distributor according to claim 1, wherein a mounting base is fixed on the uncovered portion of said fixed base and said case is fixed on said mounting base to fix said pick-up coil on said fixed base in said cantilever fashion.

3. A distributor according to claim 1, wherein said case is directly fixed on the uncovered portion of said fixed base to fix said pick-up coil to said fixed base in the cantilever fashion.

4. A distributor according to claim 1, wherein said movable base includes a cylindrical portion formed at a central part of a chord of said semi-circular flange, said cylindrical portion being loosely fitted to said shaft, and said permanent magnet, formed in a cylindrical formation, is fixed on the inner surface of said cylindrical portion of said movable base.

5. A distributor according to claim 1, wherein a sleeve is loosely fitted on said shaft, said reluctor being fixed on said sleeve, said sleeve being engaged with a centrifugal angle advancing mechanism, and said pick-up coil being arranged around said sleeve.

6. A distributor according to claim 1, wherein said movable base is movable by a vacuum angle advance mechanism.

7. A distributor according to claim 1, said case being integrally formed by resin for molding said pick-up coil.

8. A distributor according to claim 1, wherein said stator includes a base for fixing said stator on the semi-circular flange of said movable base, a pair of arms extending in parallel to said shaft and above a surface of the semi-circular flange of said movable base, and wherein said at least one claw is a pair of claws formed at respective top end portions of said arms arranged to be opposed to the claws of said reluctor, said pair of claws being located on an imaginary line crossing the center point of said shaft.

9. A distributor for a contactless ignition apparatus of an internal combustion engine, comprising a distributor shaft arranged to rotate in synchronism with the engine, a distribution rotor arranged to rotate together with said shaft, an electrode for receiving power from said distributor rotor, a distributor cap to which said electrode is fixed, a housing combined with said cap to form the outline of the distributor and supporting said distribution shaft at the center thereof, a pick-up coil coaxially disposed around said distributor shaft, means for forming a magnetic path crossing to said pick-up coil through said shaft, means for inducing a signal voltage on said pick-up coil by changing the magnetic flux in the magnetic path at an ignition timing, an ignition control circuit for shaping the waveform of the signal voltage, a switching element for switching the current flowing into a primary coil of an ignition coil in accordance with the output of said ignition control circuit, a control circuit module including said ignition control circuit and said switching element which are mounted on a metal base, a resin case integrally connected to said pick-up coil, means for fixing said control circuit module on said resin case such that the metal base forms a portion of an outer wall of said resin case, a heat-dispersion path for dispersing the heat being produced by said switching element to a heat-conductive material within said distributor through said metal base, and means for fixing a contactless ignition device including said resin case having said control circuit module and said pick-up coil to a fixing member within said distributor in such a manner that said contactless ignition device does not touch to any movable member within said distributor.

10. A distributor for a contactless ignition apparatus of an internal combustion engine, comprising a distributor shaft arranged to rotate in synchronism with the engine, a distribution rotor mounted on the top of said shaft, an electrode for receiving power from said distributor rotor, a distributor cap to which said electrode is fixed, a housing combined with said cap to form the outline of the distributor and supporting said distribution shaft at the center thereof, a pick-up coil coaxially disposed around said distributor shaft, means for forming a magnetic path crossing to said pick-up coil through said shaft, means for inducing a signal voltage on said pick-up coil by changing the magnetic flux in the magnetic path at an ignition timing, an ignition control circuit for shaping the waveform of the signal voltage, a power transistor for switching the current flowing into a primary coil of an ignition coil in accordance with the output of said ignition control circuit, a supporting member integrally connected to said pick-up coil for supporting said pick-up coil, said control circuit and said power transistor, a heat-dispersion plate forming a portion of an outer wall of said supporting member, means for connecting said power transistor to an inner wall of said heat-dispersion plate, a heat-conductive member attached to the outer surface of said heat-dispersion plate for forming a heat-dispersion path dispersing the heat produced by said power transistor, means for fixing said heat-conductive member to said housing, and means for fixing a contactless ignition device including said pick-up coil and said supporting member to said heat-conductive member in such a manner that said contactless ignition device does not touch to any movable member within said distributor.

11. A distributor aaccording to claim 10, wherein said supporting member includes terminal plates connected to said ignition control circuit, terminal plates connected to said pick-up coil, means for combining said pick-up coil with said supporting member into an assembly so that contact is made between said terminal plates of said ignition circuit and said terminal plates of said pick-up coil, and means for fixing said assembly of said supporting member and said pick-up coil to a fixing member within said distributor in such a manner that said contactless ignition device does not touch to any movable member within said distributor.

12. A distributor according to claim 11, wherein said assembly includes an output terminal plate for supplying electric current to the primary coil of the ignition coil from said power transistor and a power supply terminal for supplying power to said ignition control circuit and said power transistor.

13. A distributor according to claim 10, wherein a heat-conductive member is fixed on a portion of a fixed base within said distributor and said heat-dispersion plate is in contact with said heat-conductive member to disperse the heat produced by said power transistor to a heat-conductive material within said distributor through said heat-dispersion plate.

14. A distributor according to claim 10, wherein said heat-dispersion plate is indirectly contacted with a fixed base within said distributor.

15. A distributor according to claim 10, wherein said heat-conductive member is a portion of said housing.

*16. A distributor for a contactless ignition apparatus, the distributor comprising a housing means, a distributor shaft means rotatably mounted in the housing means, means including a stator means for forming a closed magnetic loop, means for mounting the stator means so as to be adjustably displaceable, a base member fixed to said housing means for rotatably supporting the mounting means for the stator means, an annular pick-up coil means coaxially disposed around said distributor shaft means and arranged to cross a portion of the magnetic loop so as to enable a detecting of changes in the magnetic fluxes occurring in the magnetic loop, an ignition control circuit means operatively connected to said pick-up coil means for interrupting a primary current of an ignition coil means in response to a detection signal generated in the pick-up coil means, and means for mounting the pick-up coil means and said ignition control circuit means of a portion of the fixed base member so as to prevent a relative rotation between the ignition control circuit means and the pick-up coil means.*

*17. A contactless ignition apparatus comprising a distributor shaft means, an annular pick-up coil means adapted to be coaxially disposed around the distributor shaft means for detecting magnetic fluxes in a magnetic circuit of a distributor, an ignition control circuit module operatively connected to said pick-up coil means for interrupting a primary current of an ignition coil means in response to a detection signal generated in the pick-up coil means, and means for mounting said annular pick-up coil means to the ignition control circuit module so as to enable the annular pick-up coil means to be mounted to a fixed member in the distributor in a cantilevered manner.*

*18. An apparatus according to claim 17, wherein said means for mounting said annular pick-up coil means includes a case means for accommodating the ignition control circuit means connected to said annular pick-up coil means.*

*19. An apparatus according to claim 18, wherein said case means is integrally formed of a resin for molding the annular pick-up coil means.*

*20. An apparatus according to claim 18, wherein said ignition control circuit means includes an ignition signal generator circuit including a signal detection transistor, an amplifier circuit, and a drive circuit means for an output transistor.*

*21. A distributor for a contactless ignition apparatus of an internal combustion engine having a plurality of cylinders, the distributor comprising: a distributor shaft adapted to be rotated in synchronism with the engine; a distributor rotor arranged to rotate together with said shaft; a fixed electrode for receiving power from said distributor rotors; a distributor cap to which said fixed electrode is fixed; a housing combined with said cap to form the outline of the distributor and supporting said distribution shaft at the center thereof; a reluctor arranged to rotate together with said shaft having a number of claws equal in number to an engine cylinders and mounted on a periphery of said reluctor at equal spatial intervals; a stator having at least one claw arranged in opposition to said reluctor claws; a movable base rotatably supported relative to said housing for mounting said stator; a permanent magnet for forming a closed magnetic path in conjunction with said reluctor, said stator, and continuous metal members existing between said reluctor and said stator; an annular pick-up coil coaxially disposed around said distributor shaft and arranged so as to cross a portion of said magnetic path; a case coupled to said pick-up coil; ignition control means connected to said case; and means for supporting, in a cantilever fashion, the pick-up coil, by way of said case relative to said housing.*

*22. A distributor for a contactless ignition apparatus, the distributor comprising a housing means, a distributor shaft means rotatably mounted in the housing means, means including a stator means for forming a closed magnetic loop, means for mounting the stator means so as to be adjustably displaceable, a base member fixed to said housing means for supporting the mounting means for the stator means, an annular pick-up coil means coaxially disposed around said distributor shaft means and arranged to cross a portion of the magnetic loop so as to enable a detecting of the changes in the magnetic fluxes occurring in the magnetic loop, an emission control circuit means operatively connected to said pick-up coil means for interrupting a primary current of an ignition coil means in response to a detection signal generated in the pick-up coil means, and means for mounting the pick-up coil means and said ignition control circuit means on a portion of the fixed base member so as to prevent a relative rotation between the ignition control circuit means and the pick-up coil means.*

*23. A distributor for a contactless ignition apparatus, the distributor comprising a housing means, a distributor shaft means rotatably mounted in the housing means, means including a stator means for forming a closed magnetic loop, means for mounting the stator means so as to be adjustably displaceable, a base member fixed to said housing means for supporting the mounting means for the stator means, and annular pick-up coil means coaxially disposed around said distributor shaft means and arranged to corss a portion of the magnetic loop so as to enable a detecting of changes in the magnetic flux occurring in the magnetic loop, an ignition control circuit means operatively connected to said pick-up coil means for interrupting a primary current of an ignition coil means in response to a detection signal generated in the pick-up coil means, and means for mounting the annular pick-up coil means and said ignition control circuit means on a portion of the fixed base member including a case means for accommodating the ignition control circuit means connected to said annular pick-up coil means.*

*24. An apparatus according to claim 23, wherein said case means is integrally formed with a resin for molding the annular pick-up coil means.*

*25. An apparatus according to claim 23, wherein said ignition control circuit means includes an ignition signal generator circuit including a signal detection transistor, an amplifier circuit, and a drive circuit means for an output transistor.*

* * * * *